US009143521B2

(12) United States Patent
Denton et al.

(10) Patent No.: US 9,143,521 B2
(45) Date of Patent: Sep. 22, 2015

(54) DETECTION OF INTRUSION IN A WIRELESS NETWORK

(71) Applicant: International Business Machines Corporation, Armonk, NY (US)

(72) Inventors: Guy S. Denton, Raleigh, NC (US); Joshua Lackey, Snohomish, WA (US)

(73) Assignee: International Business Machines Corporation, Armonk, NY (US)

( * ) Notice: Subject to any disclaimer, the term of this patent is extended or adjusted under 35 U.S.C. 154(b) by 116 days.

(21) Appl. No.: 13/939,305

(22) Filed: Jul. 11, 2013

(65) Prior Publication Data
US 2013/0305370 A1 Nov. 14, 2013

Related U.S. Application Data

(63) Continuation of application No. 10/177,503, filed on Jun. 19, 2002, now Pat. No. 8,539,580.

(51) Int. Cl.
*H04L 29/06* (2006.01)
*H04W 12/12* (2009.01)
(52) U.S. Cl.
CPC ........ *H04L 63/1425* (2013.01); *H04L 63/1416* (2013.01); *H04W 12/12* (2013.01)
(58) Field of Classification Search
CPC H04L 63/1416; H04L 63/1425; H04W 12/12
USPC .......................................................... 726/23
See application file for complete search history.

(56) References Cited

U.S. PATENT DOCUMENTS

| 5,319,711 | A | | 6/1994 | Servi |
| 5,539,824 | A | | 7/1996 | Bjorklund et al. |
| 5,673,317 | A | | 9/1997 | Cooper |
| 5,875,394 | A | | 2/1999 | Daly et al. |
| 6,064,737 | A | | 5/2000 | Rhoads |
| 6,292,833 | B1 | | 9/2001 | Liao et al. |
| 6,311,167 | B1 | | 10/2001 | Davis et al. |
| 6,484,203 | B1 | * | 11/2002 | Porras et al. ................... 709/224 |
| 7,099,320 | B1 | * | 8/2006 | Salerno .......................... 370/389 |
| 2002/0188870 | A1 | * | 12/2002 | Gong et al. .................... 713/201 |
| 2003/0145232 | A1 | * | 7/2003 | Poletto et al. ................. 713/201 |

OTHER PUBLICATIONS

Dennis Fisher, Startup Takes on WLAN Security, Jun. 3, 2002, [Retrieved on Jun. 19, 2002] Retrieved from the Internet:< URL: http://www.eweek.com/article2/0,3959,24270,00.asp>, 3 pages.

(Continued)

*Primary Examiner* — Harunur Rashid
(74) *Attorney, Agent, or Firm* — Schmeiser, Olsen & Watts, LLP; David M. Quinn

(57) ABSTRACT

A method and associated system for detecting intrusion of a wireless network. A determination is made that a first data stream received by the wireless network does not include N1 communication protocols included in a second data stream previously determined to be valid, N1 being a positive integer. A determination is made that N1 exceeds a predetermined first tolerance, and in response, that the first data stream does not include N2 communication protocols included in a third data stream previously determined to be intrusive to the wireless network, N2 being an integer equal to or greater than zero. A determination is made that N2 is less than a predetermined second tolerance, and in response, an alert that the received data stream is potentially intrusive to the wireless network is generated.

18 Claims, 3 Drawing Sheets

(56) References Cited

OTHER PUBLICATIONS

AirDefense, AirDefense: Functionality, Proactive real-time 7x24 intrusion protection for wireless LANs, [Retrieved on Jun. 19, 2002] Retrieved from the Internet:< URL: http://www.airdefense.net/products/functions.html>, 2 pages.

AirDefense, Enterprise Wireless LAN Security, Industry-First Wireless LAN Intrusion Detection and Protection, 24x7 real-time monitoring of 802.11 WLANs, [Retrieved on Jun. 19, 2002] Retrieved from the Internet:< URL: http://www.airdefense.net/>, 1 page.

AirDefense, News & Press, AirDefense Launches Industry's First Enterprise Wireless LAN Security Appliance, Jun. 3, 2002, [Retrieved on Jun. 19, 2002] Retrieved from the Internet:< URL: http://www.airdefense.net/newsandpress/press_releases/06_03_02.html>, 2 pages.

AirDefense, Products, AirDefense—WLAN Security Appliance, Monitor and protect your enterprise Wireless LAN Airwaves, [Retrieved on Jun. 19, 2002] Retrieved from the Internet< URL: http://www.airdefense.net/products/index.html>, 2 pages.

AirDefense, AirDefense: Key Technologies, State Analysis Engine & Multi-dimensional Intrusion Detection Technology, [Retrieved on Jun. 19, 2002] Retrieved from the Internet:< URL: http://www.airdefense.net/products/keytech.html>, 2 pages.

Bob Brewin, ComputerWorld, Security Appliance Monitors Wireless LANs, Jun. 10, 2002, [Retrieved on Jun. 19, 2002] Retrieved from the Internet:< URL: http://www.computerworld.com/mobiletopics/mobile/technology/story/0,10801,71875,00.html>, 2 pages.

John Cox, NetworkWorldFusion, Start-up comes to the defense of wireless LAN users, Jun. 3, 2002, [Retrieved on Jun. 19, 2002] Retrieved from the Internet< URL: http://www.nwfusion.com/news/2002/133072_06-03-2002.html>, 4 pages.

Mary Jane Credeur, Atlanta Business Chronicle, AirDefense securing wireless networks, [Retrieved on Jun. 19, 2002] Retrieved from the Internet:< URL: http://atlanta.bizjournals.com/atlanta/stories/2002/06/03story4.html> 4 pages.

Anniversary Issue, Atlanta Catalyst, targeting those who precipitate change, Sep. 2000, 1 page.

Brian Fonseca, InforWorld, AirDefense torpedoes wireless threats, Jun. 3, 2002, [Retrieved on Jun. 19, 2002] Retrieved from the Internet: < URL: http://www.infoworld.com/articles/hn/xml/02/06/03/020603hnairdefense.xml>, 2 pages.

Notice of Allowance (Mail Date May 15, 2013) for U.S. Appl. No. 10/177,503, Filing Date Jun. 19, 2002, First Named Inventor Guy S. Denton, Confirmation No. 2880.

Examiner's Answer (Mail Date Feb. 23, 2009) for U.S. Appl. No. 10/177,503, Filing date Jun. 19, 2002, First Named Inventor Guy S. Denton, Confirmation No. 2880.

Appeal Brief (filed Dec. 3, 2008) for U.S. Appl. No. 10/177,503, Filing Date Jun. 19, 2002, First Named Inventor Guy S. Denton, Confirmation No. 2880.

Notice of Appeal (filed Oct. 28, 2008) for U.S. Appl. No. 10/177,503, Filing Date Jun. 19, 2002, First Named Inventor Guy S. Denton, Confirmation No. 2880.

Final Office Action (Mail Date Jul. 30, 2008) for U.S. Appl. No. 10/177,503, Filing Date Jun. 19, 2002, First Named Inventor Guy S. Denton, Confirmation No. 2880.

Response (filed May 22, 2008) for U.S. Appl. No. 10/177,503, Filing Date Jun. 19, 2002, First Named Inventor Guy S. Denton, Confirmation No. 2880.

Response (filed May 1, 2007) for U.S. Appl. No. 10/177,503, Filing Date Jun. 19, 2002, First Named Inventor Guy S. Denton, Confirmation No. 2880.

Office Action (Mail Date Feb. 1, 2007) for U.S. Appl. No. 10/177,503, Filing Date Jun. 19, 2002, First Named Inventor Guy S. Denton, Confirmation No. 2880.

Request for pre-appeal conference (filed Nov. 21, 2006) for U.S. Appl. No. 10/177,503, Filing Date Jun. 19, 2002, First Named Inventor Guy S. Denton, Confirmation No. 2880.

Notice of Appeal (filed Jul. 31, 2006) for U.S. Appl. No. 10/177,503, Filing Date Jun. 19, 2002, First Named Inventor Guy S. Denton, Confirmation No. 2880.

Advisory Action (Mail Date Jun. 14, 2006) for U.S. Appl. No. 10/177,503, Filing Date Jun. 19, 2002, First Named Inventor Guy S. Denton, Confirmation No. 2880.

Response (filed May 30, 2006) for U.S. Appl. No. 10/177,503, Filing Date Jun. 19, 2002, First Named Inventor Guy S. Denton, Confirmation No. 2880.

Office Action (Mail Date Mar. 29, 2006) for U.S. Appl. No. 10/177,503, Filing Date Jun. 19, 2002, First Named Inventor Guy S. Denton, Confirmation No. 2880.

Response (filed Jan. 20, 2006) for U.S. Appl. No. 10/177,503, Filing Date Jun. 19, 2002, First Named Inventor Guy S. Denton, Confirmation No. 2880.

Office Action (Mail Date Oct. 20, 2005) for U.S. Appl. No. 10/177,503, Filing Date Jun. 19, 2002, First Named Inventor Guy S. Denton, Confirmation No. 2880.

\* cited by examiner

DETECTION OF INTRUSION IN A WIRELESS NETWORK

This application is a continuation application claiming priority to Ser. No. 10/177,503, filed Jun. 19, 2002, now U.S. Pat. No. 8,539,580, issued Sep. 17, 2013.

BACKGROUND OF THE INVENTION

1. Field of the Invention

The present invention generally relates to a method, system and program product for detecting intrusion of a wireless network. More specifically, the present invention detects intrusion of a wireless network by comparing a data stream received by a wireless network to a valid data stream and a known intrusion data stream.

2. Background Art

Wireless computer networks are playing an increasing role in business and in personal lives. Specifically, as more businesses and individuals implement computer networks, the need to provide less complex configurations becomes more pervasive. Wireless networks are especially advantageous in eliminating the physical constraints (e.g., wiring, etc.) of traditional networking With wireless networks, the mobility of the network users is greatly increased. Such mobility can be important in increasing user efficiency and is often desired by industry (e.g., health care, retail, etc.) as well as individuals. For example, if a hospital worker is electronically maintaining patients' vitals on a laptop computer, and he/she needs to move freely between patient rooms, a wireless network would allow the worker to do so with ease. In contrast, if the laptop's network connection was hardwired (e.g., via Ethernet), the user must disengage the existing connection and make a new connection in the alternate location. However, making a new connection is not always easy because the user is limited to locations in which a data port exists for making a connection.

Unfortunately, as the use of wireless networks has become more pervasive, so have attacks. Specifically, hackers are increasingly intruding the wireless networks and causing great amounts of damage. One type of intrusion is known as "war driving," which is when a hacker detects the presence of and accesses a wireless network from an unprotected area such as a street or a parking lot. Typically, a war driving hacker will drive around with a laptop or the like until a wireless network is identified. Once identified, the hacker can potentially gain access to an internal, less well-protected network.

Heretofore, no systems exist for effectively detecting intrusion of a wireless network. Specifically, because the growth in popularity of wireless networks is a relatively recent phenomena, and the manner in which wireless connections are formed are different from those for traditional "wire" networks, intrusion detection technology has been lacking.

In view of the foregoing, there exists a need for a method, system and program product for detecting intrusion of a wireless network. Specifically a need exists for an incoming data stream to be compared to a valid data stream and a known intrusion stream to determine any deviations. Still yet, a need exists for an intrusion alert to be generated when intrusion is detected.

SUMMARY OF THE INVENTION

In general the present invention provides a method, system and program product for detecting intrusion of a wireless network. Specifically, the present invention compares a data stream received by a wireless network to a valid data stream to determine a validity deviation. If the validity deviation exceeds a predetermined threshold, the data stream is compared to a known intrusion stream to determine an intrusion deviation. If the intrusion deviation is less than an intrusion threshold, intrusion is detected and an alert is generated.

According to a first aspect of the present invention, a method for detecting intrusion of a wireless network is provided. The method comprises: (1) determining a validity deviation of a data stream received by a wireless network; and (2) determining an intrusion deviation of the data stream if the validity deviation exceeds a validity threshold, wherein intrusion is detected if the intrusion deviation is less than an intrusion threshold.

According to a second aspect of the present invention, a method for detecting intrusion of a wireless network is provided. The method comprises: (1) detecting a data stream received by a wireless network; (2) monitoring for key indicator flags within the data stream; (3) determining a validity deviation of the data stream by comparing the data stream to a valid data stream; (4) determining an intrusion deviation of the data stream if the validity deviation exceeds a validity threshold by comparing the data stream to a known intrusion data stream, wherein intrusion is detected if the intrusion deviation is less than an intrusion threshold or if a key indicator flag is detected; and (5) generating an intrusion alert if intrusion is detected.

According to a third aspect of the present invention, a system for detecting intrusion of a wireless network is provided. The system comprises: (1) a validity deviation system for determining a validity deviation of a data stream received by a wireless network; and (2) an intrusion deviation system for determining an intrusion deviation of the data stream if the validity deviation exceeds a validity threshold, wherein intrusion is detected if the intrusion deviation is less than an intrusion threshold.

According to a fourth aspect of the present invention, a program product stored on a recordable medium for detecting intrusion of a wireless network is provided. When executed, the program product comprises: (1) program code for determining a validity deviation of a data stream received by a wireless network; and (2) program code for determining an intrusion deviation of the data stream if the validity deviation exceeds a validity threshold, wherein intrusion is detected if the intrusion deviation is less than an intrusion threshold.

Therefore, the present invention provides a method, system and program product for detecting intrusion of a wireless network.

BRIEF DESCRIPTION OF THE DRAWINGS

These and other features of this invention will be more readily understood from the following detailed description of the various aspects of the invention taken in conjunction with the accompanying drawings in which.

Figure 1:
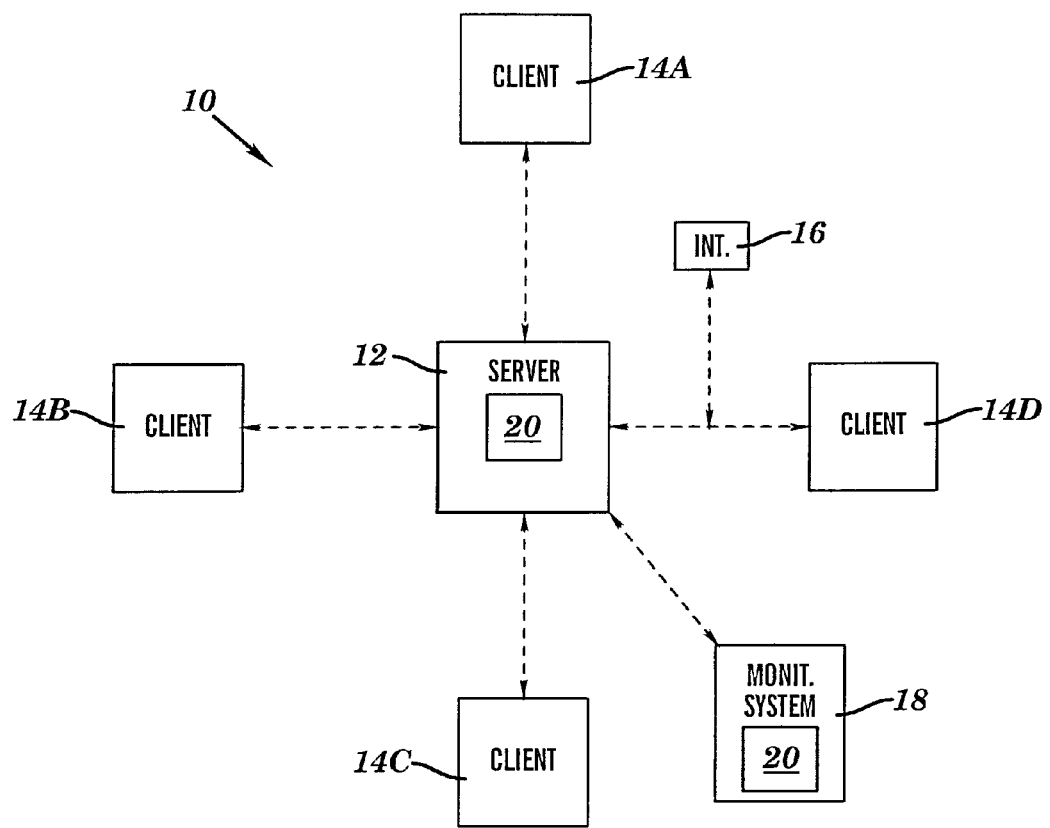
FIG. 1 depicts a block diagram of a wireless network being monitored for intrusion according to the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE DRAWINGS

In general, the present invention provides a method, system and program product for detecting intrusion of a wireless network. Specifically, under the present invention, a data stream received by a wireless network is detected (i.e., monitored for). Once detected, a validity deviation is determined by comparing the data stream to at least one valid data stream. If the validity deviation is greater than a validity threshold, an intrusion deviation is determined by comparing the data stream to at least one known intrusion stream. If the intrusion deviation is less than an intrusion threshold, intrusion is detected and an intrusion alert is generated.

Referring now to FIG. 1, an exemplary wireless network 10 is depicted. As shown, wireless network 10 includes server 12 and clients 14A-D. It should be understood that wireless network 10 as depicted is illustrative only and many variations are possible. For example, wireless network 10 could include more servers and a different quantity of clients. In a typical embodiment, wireless network 10 is a wireless local area network (LAN) implemented under the I.E.E.E. 802.11 (a) or 802.11(b) standards, which are well known in the art. However, it should be understood that the teachings described herein could be implemented with any type of wireless network and/or wireless network standard. Server 12 can be any known type server equipped with wireless technology such as a UNIX server. Moreover, it should appreciated that clients 14A could be any type of computerized system capable of communicating with server 12 in a wireless client-server environment. For example, clients 14A-D could be workstations, laptops, personal digital assistants, etc. To this extent, clients 14A-D could implement technology available from Symbionics Networks, Ltd. such as a wireless LAN adapter adapted to fit on a Personal Computer Memory Card Industry Association (PCMCIA) card.

As show, clients 14A-D communicate with server 12. In general, communication includes the transmission of data packets between clients 14A-D and server 12. As described above, wireless network 10 can be subject to intrusion by hacker 16. One common form of intrusion is known as war driving which is where hacker 16 will physically move about an area (e.g., a city) with a laptop computer seeking wireless networks. Such networks are generally identifiable based on the data transmissions that occur between clients 14A-D and server 12. Once a wireless network has been identified, hacker 16 can then intrude the network (e.g., by "high jacking" one of the network connections).

For example, if client 14A was communicating with server 12, hacker 16 could interpose a sequence of data packets that would confuse server 12 and client 14D. Such confusion would disjoint the wireless connection and allow hacker 16 to form his/her own wireless connection with server 12. Server 12, believing that hacker 16 was actually client 14A, would then communicate with hacker 16. Such communication would provide hacker 16 with the opportunity to intrude wireless network 10.

Under the present invention, a monitoring system 18 having detection system 20 can be provided. As will be further described below, detection system 20 will detect (i.e., monitor for) and analyze data streams to and from server 12 to detect intrusion by hacker 16. In detecting a data stream, detection system 20 could detect all data streams in and out of server 12, or it could be programmed to detect and analyze data streams at predetermined time intervals (e.g., every five minutes). Moreover, detection system 20 can detect and analyze individual data packets, or a sequence of multiple data packets (i.e., a data stream as detected and analyzed hereunder could include one or more data packets). In a typical embodiment, monitoring system 18 is a secure "black box" such as a laptop computer or the like. In addition, although detection system 20 is typically loaded on a separate monitoring system 18, it could be loaded on server 12.

It should be appreciated that one monitoring system 18 is shown for illustrative purposes only. Specifically, the teachings of the present invention could be implemented with any quantity of monitoring systems 18. Where more than one monitoring system 18 is provided, each monitoring system 18 could be assigned a unique identifier flag so that each could be identifiable and centrally controlled.

Figure 2:
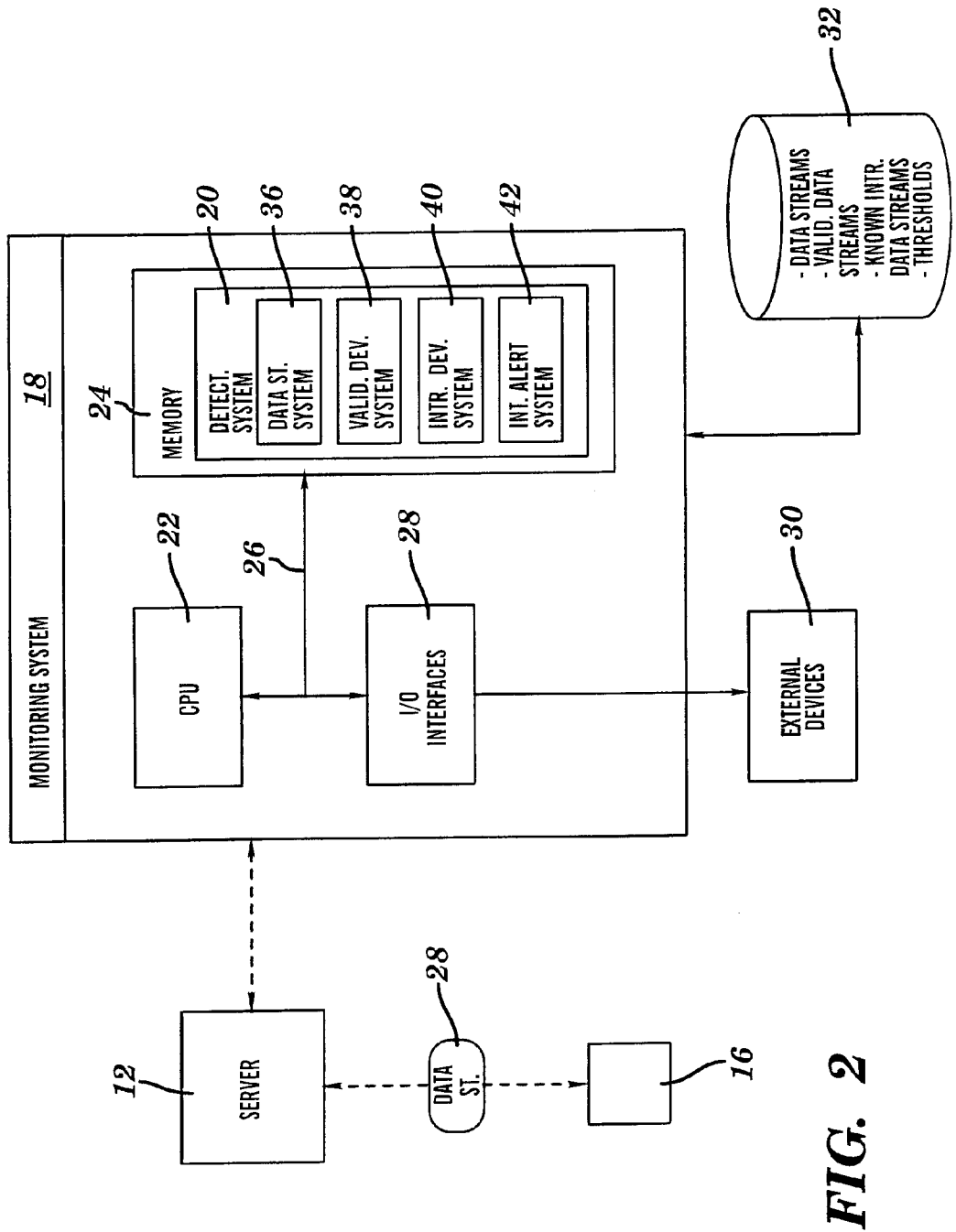
FIG. 2 depicts a more detailed depiction of the monitoring system of FIG. 1.

Referring now to FIG. 2, a more detailed diagram of monitoring system 18 and detection system 20 is shown. As depicted, monitoring system 18 generally comprises central processing unit (CPU) 22, memory 24, bus 26, input/output (I/O) interfaces 28, external devices/resources 30 and database 32. CPU 22 may comprise a single processing unit, or be distributed across one or more processing units in one or more locations, e.g., on a client and server. Memory 24 may comprise data storage, including magnetic media, optical media, random access memory (RAM), read-only memory (ROM), a data cache, a data object, etc. Moreover, similar to CPU 22, memory 24 may reside at a single physical location, comprising one or more types of data storage, or be distributed across a plurality of physical systems in various forms. Memory 24 may comprise a single memory or may comprise one or more memories.

I/O interfaces 28 may comprise any system for exchanging information to/from an external source. External devices/resources 30 may comprise any known type of external device, including speakers, a CRT, LED screen, hand-held device, keyboard, mouse, voice recognition system, speech output system, printer, monitor, facsimile, pager, etc. Bus 26 provides a communication link between each of the components in monitoring system 18 and likewise may comprise any known type of transmission link, including electrical, optical, wireless, etc. In addition, although not shown, additional components, such as cache memory, communication systems, system software, etc., may be incorporated into monitoring system 18.

Database 32 may provide storage for information necessary to carry out the present invention. Such information could include, among other things, data streams received by server 12, a library (i.e., set of) of valid data streams, a library (i.e., set of) of known intrusion data streams, thresholds, etc. As such, database 32 may include one or more storage devices, such as a magnetic disk drive or an optical disk drive. In another embodiment, database 32 includes data distributed across, for example, a local area network (LAN), wide area network (WAN) or a storage area network (SAN) (not shown). Database 32 may also be configured in such a way that one of ordinary skill in the art may interpret it to include one or more storage devices. It should be understood that although not shown, server 12 and clients 14A-D typically contain components (e.g., CPU, memory, etc.) similar to monitoring system 18. Such components have not been separately depicted and described for brevity purposes.

Stored in memory 24 of monitoring system 18 is detection system 20 (shown as a program product). As shown, detection system 20 generally includes data stream system 36, validity deviation system 38, intrusion deviation system 40 and intrusion alert system 42. Data stream system 36 will detect (i.e., monitor for) data streams received by server 12. To this extent, data stream system could be programmed to detect and copy all data streams received by server 12 or intermitted data streams. Moreover, as indicated above, a data stream could include one or more data packets. Upon detecting a data stream for analysis, data steam system 36 will copy the data stream to database 32, where it can be stored for a predetermined amount of time (e.g., five minutes).

Once stored, data stream system 36 can optionally monitor for and detect any key indicator flags in the data stream. In general, key indicator flags help identify data streams that are viewed as inherently intrusive or invalid. A typical example of such data streams are those which attempt to contact invalid access points. To this extent, "dummy" access points could be set up within network 10 to help identify hacker 16. In general, intrusion through a "dummy" access point is cultivated through "passive" hacking because hacker 16 will typically sit in a parking lot, or the like, without transmitting data. Rather, hacker 16 would simply monitor for data streams. Once hacker 16 has accumulated enough data packets, he/she could intrude network 10. To entice hacker 16, a series of "dummy" access points (e.g., with easily determinable wired equivalent privacy cracks) could be set up. Hacker 16, believing that a "dummy" access point was valid, would attempt to associate with the "dummy." In so doing, hacker 16 would go from passive mode to active mode and be detected. If a key indicator flag was detected, intrusion is detected and alert system 42 would generate and output an intrusion alert.

It should be understood that any type of key indicator flags could be monitored for under the present invention. Typical examples include, among others, predefined traffic patterns such as known invalid or older service set identifiers (SSIDs), invalid media access controls (MACs), or time of day indicators such as traffic outside of normal working hours. In addition, it should be appreciated that data stream system 36 could also monitor for state-based intrusion indicators in a data stream such as too many queries being transmitted at the same time from the same system (as will be further described below). Regardless of the type of flags and/or indicators being monitored for, an intrusion alert can be generated if detected.

In any event, once data stream system 36 has completed its detection function(s), validity deviation system 38 will determine a validity deviation of the data stream. In general, the validity deviation is determined by comparing the data stream to a library of one or more valid data streams (e.g., as stored in database 32). Specifically, the communication protocols of the data stream are compared to those of valid data streams and any deviation is noted. For example, if a valid data stream between server 12 and a valid client 14A-D has the protocols of "A, B and C," and the received data stream has the protocols of "A, G, and X," a validity deviation of "2" is present (i.e., because the received data stream failed to include the protocols of "B and C").

If the validity deviation is greater than a validity threshold, an intrusion deviation will be calculated. Specifically, some amount of validity deviation (e.g., 1) could be within tolerable limits. However, if the tolerable limits were exceeded, the data stream could be too deviant from valid data streams and should be examined more closely. In such a case, intrusion deviation system 40 will then compare the protocols of the received data stream to those of one or more known intrusion data streams (e.g., stored as a library of known intrusion streams in database 32). As used herein the term "known intrusion streams" is intended to refer to any data stream generally known to be used by a hacker in intruding a network. The intrusion deviation is calculated similar to the validity deviation. For example, if a known intrusion stream has the protocols of "X, Y and Z" and the received data stream has the protocols of "X, Y and A," an intrusion deviation of "1" exists. In this case, however, if the intrusion deviation is less than an intrusion threshold (e.g., 2), intrusion is detected. Specifically, if the intrusion deviation is lower than the intrusion threshold, the received data stream is too similar to the known intrusion stream to be safely allowed. In this event, intrusion alert system 42 will generate and output an intrusion alert that warns of the pending intrusion. It should be appreciated that the intrusion alert as generated and outputted hereunder can be any type of alert known (or later known) in the art. For example, the intrusion alert could be an electronic mail message that is automatically generated and sent to an administrator of wireless network 10 (or some other party).

It should be also appreciated that key indicator flags, state-based intrusion indicators, valid data streams, known intrusion data streams, protocols, validity thresholds and intrusion thresholds can be determined and programmed by an examiner or administrator of detection system 20 and stored in database 32. Accordingly, the deviations, thresholds and protocols shown above are for illustrative purposes only and are not intended to be limiting.

As indicated above, it should be understood that in addition to detecting key indicator flags, calculating validity deviations and intrusion deviations, data stream system 36 could also detect state based intrusion indicators. One example of a state-based intrusion indicator could be if too many "valid" queries are being transmitted from the same system at the same time. Such communication could be an indication of a ping flood or attempted denial of service attacks. To this extent, detection of state-based indicators could occur prior to calculation of the validity deviation or after calculation of the intrusion deviation. In any event, if too many queries are detected, an intrusion alert will be generated (regardless of the outcome of the validity deviation and/or intrusion deviation calculations).

Figure 3:
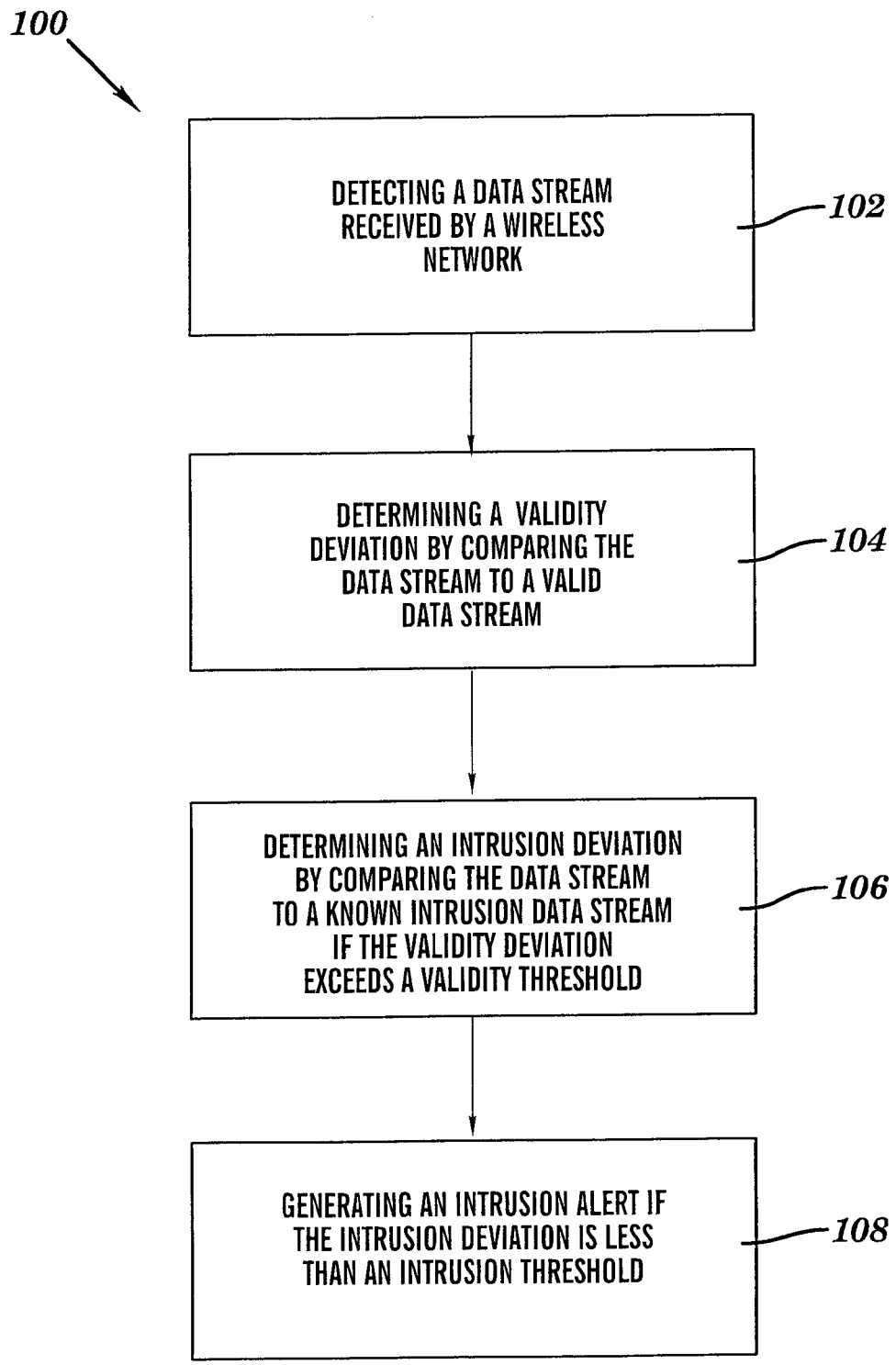
FIG. 3 depicts a method flow diagram according to the present invention.

Referring now to FIG. 3, a method flow diagram 100 according to the present invention is shown. As depicted, first step 102 in method is to detect a data stream received by a wireless network. Once detected, the data stream is analyzed. Specifically, second step 104 is to determine a validity deviation by comparing the data stream to a (at least one) valid data stream. If the validity deviation is greater than a validity threshold, an intrusion deviation is determined in third step 106. If the intrusion deviation is less than an intrusion threshold, intrusion is detected and an intrusion alert is generated in fourth step 108.

It is understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, controls monitoring system 18 such that it carries out the methods described herein. Alternatively, a specific use computer, containing specialized hardware for carrying out one or more of the functional tasks of the invention could be utilized. A computer system of the present invention may comprise one or more processors, one or more computer-readable memories, one or more computer-readable storage devices, and program instructions stored on at least one of the one or more storage devices for execution by at least one of the one or more processors via at least one of the one or more memories.

The present invention can also be embedded in a computer program product, which comprises all the features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form. A computer program product for implementing the present invention may comprise one or more computer-readable storage devices and program instructions stored on at least one of the one or more storage devices. The term "computer-readable storage device" does not encompass signal propagation media such as copper cables, optical fibers and wireless transmission media.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A method for detecting intrusion of a wireless network, the method comprising:
   determining, by one or more processors, that a first data stream received by the wireless network does not include N1 communication protocols included in a second data stream previously determined to be valid, N1 being a positive integer;
   determining, by the one or more processors, that N1 exceeds a predetermined first tolerance, and in response, the one or more processors determining that the first data stream does not include N2 communication protocols included in a third data stream previously determined to be intrusive to the wireless network, N2 being an integer equal to or greater than zero; and
   determining, by the one or more processors, that N2 is less than a predetermined second tolerance and that a condition is satisfied, and in response, generating, by the one or more processors, an alert that the received first data stream is potentially intrusive to the wireless network, wherein the condition is selected from the group consisting of the first data stream matches a predefined traffic pattern, the first data stream has an invalid service set identifier, the first data stream has an older service set identifier, the first data stream has an invalid media access control, the first data stream occurs outside of normal working hours, and the first data stream includes too many queries from a same sender.

2. The method of claim 1, wherein the method comprises:
   determining, by the one or more processors, that the first data stream does not include N3 communication protocols included in a fourth data stream previously determined to be intrusive to the wireless network, in response to the determining that N1 exceeds the predetermined first tolerance and prior to the determining that the first data stream does not include the N2 communication protocols included in a third data stream, wherein N3 is an integer equal to or greater than one; and
   determining, by the one or more processors, that N3 is equal to or greater than the predetermined second tolerance.

3. The method of claim 1, wherein the second data stream is in a first library of data streams previously determined to be valid, the first library being stored in a first storage device, and wherein the third data stream is in a second library of data streams previously determined to be intrusive to the wireless network, the second library being stored in a second storage device.

4. The method of claim 1, wherein N1 is 2, the predetermined first tolerance is 1, N2 is 1 and the predetermined second tolerance is 2.

5. The method of claim 1, wherein the first data stream consists of one data packet.

6. The method of claim 1, wherein the first data stream comprises a plurality of data packets.

7. A computer program product for detecting intrusion of a wireless network, the computer program product comprising one or more computer-readable storage devices and program instructions stored on at least one of the one or more storage devices, the program instructions comprising:
   program instructions to determine that a first data stream received by the wireless network does not include N1 communication protocols included in a second data stream previously determined to be valid, N1 being a positive integer;
   program instructions to determine that N1 exceeds a predetermined first tolerance, and in response, to determine that the first data stream does not include N2 communication protocols included in a third data stream previously determined to be intrusive to the wireless network, N2 being an integer equal to or greater than zero; and
   program instructions to determine that N2 is less than a predetermined second tolerance and that a condition is satisfied, and in response, to generate an alert that the received first data stream is potentially intrusive to the wireless network, wherein the condition is selected from the group consisting of the first data stream matches a predefined traffic pattern, the first data stream has an invalid service set identifier, the first data stream has an older service set identifier, the first data stream has an invalid media access control, the first data stream occurs outside of normal working hours, and the first data stream includes too many queries from a same sender.

8. The computer program product of claim 7, wherein the program instructions comprise:
   program instructions to determine that the first data stream does not include N3 communication protocols included in a fourth data stream previously determined to be intrusive to the wireless network, in response to a determination that N1 exceeds the predetermined first tolerance and prior to a determination that the first data stream does not include the N2 communication protocols included in a third data stream, wherein N3 is an integer equal to or greater than one; and
   program instructions to determine that N3 is equal to or greater than the predetermined second tolerance.

9. The computer program product of claim 7, wherein the second data stream is in a first library of data streams previously determined to be valid, the first library being stored in a first storage device, and wherein the third data stream is in a second library of data streams previously determined to be intrusive to the wireless network, the second library being stored in a second storage device.

10. The computer program product of claim 7, wherein N1 is 2, the predetermined first tolerance is 1, N2 is 1 and the predetermined second tolerance is 2.

11. The computer program product of claim 7, wherein the first data stream consists of one data packet.

12. The computer program product of claim 7, wherein the first data stream comprises a plurality of data packets.

13. A computer system for detecting intrusion of a wireless network, the computer system comprising:

one or more processors, one or more computer-readable memories, one or more computer-readable storage devices, and program instructions stored on at least one of the one or more storage devices for execution by at least one of the one or more processors via at least one of the one or more memories, the program instructions comprising:

program instructions to determine that a first data stream received by the wireless network does not include N1 communication protocols included in a second data stream previously determined to be valid, N1 being a positive integer;

program instructions to determine that N1 exceeds a predetermined first tolerance, and in response, to determine that the first data stream does not include N2 communication protocols included in a third data stream previously determined to be intrusive to the wireless network, N2 being an integer equal to or greater than zero; and program instructions to determine that N2 is less than a predetermined second tolerance and that a condition is satisfied, and in response, to generate an alert that the received first data stream is potentially intrusive to the wireless network, wherein the condition is selected from the group consisting of the first data stream matches a predefined traffic pattern, the first data stream has an invalid service set identifier, the first data stream has an older service set identifier, the first data stream has an invalid media access control, the first data stream occurs outside of normal working hours, and the first data stream includes too many queries from a same sender.

14. The computer system of claim 13, wherein the program instructions comprise:

program instructions to determine that the first data stream does not include N3 communication protocols included in a fourth data stream previously determined to be intrusive to the wireless network, in response to a determination that N1 exceeds the predetermined first tolerance and prior to a determination that the first data stream does not include the N2 communication protocols included in a third data stream, wherein N3 is an integer equal to or greater than one; and program instructions to determine that N3 is equal to or greater than the predetermined second tolerance.

15. The computer system of claim 13, wherein the second data stream is in a first library of data streams previously determined to be valid, the first library being stored in a first storage device, and wherein the third data stream is in a second library of data streams previously determined to be intrusive to the wireless network, the second library being stored in a second storage device.

16. The computer system of claim 13, wherein N1 is 2, the predetermined first tolerance is 1, N2 is 1 and the predetermined second tolerance is 2.

17. The computer system of claim 13, wherein the first data stream consists of one data packet.

18. The computer system of claim 13, wherein the first data stream comprises a plurality of data packets.

\* \* \* \* \*